(12) United States Patent
Duyvesteyn

(10) Patent No.: US 11,691,888 B2
(45) Date of Patent: Jul. 4, 2023

(54) PROCESS FOR THE PREPARATION OF HIGH PURITY ALUMINA

(71) Applicant: Scandium International Mining Corporation, Sparks, NV (US)

(72) Inventor: Willem P. C. Duyvesteyn, Reno, NV (US)

(73) Assignee: Scandium International Mining Corporation, Sparks, NV (US)

(*) Notice: Subject to any disclaimer, the term of this patent is extended or adjusted under 35 U.S.C. 154(b) by 277 days.

(21) Appl. No.: 17/321,407

(22) Filed: May 15, 2021

(65) Prior Publication Data
US 2021/0371294 A1 Dec. 2, 2021

Related U.S. Application Data

(60) Provisional application No. 63/030,894, filed on May 27, 2020.

(51) Int. Cl.
*C01F 7/44* (2022.01)
*C01F 7/46* (2006.01)
*C01F 7/441* (2022.01)
*C01C 1/26* (2006.01)

(52) U.S. Cl.
CPC ............. *C01F 7/46* (2013.01); *C01F 7/441* (2013.01); *C01C 1/26* (2013.01); *C01P 2006/80* (2013.01)

(58) Field of Classification Search
CPC .... C01F 7/46; C01F 7/441; C01F 7/20; C01F 7/22; C01F 7/24; C01F 7/26; C01C 1/26; C01P 2006/80
See application file for complete search history.

(56) References Cited

U.S. PATENT DOCUMENTS

| 4,053,579 A | 10/1977 | Kato et al. |
| 5,019,360 A * | 5/1991 | Lehto ............... C01F 7/26 423/127 |
| 5,055,019 A | 10/1991 | Meyer et al. |

(Continued)

FOREIGN PATENT DOCUMENTS

GB 448 107 A * 5/1936 ............... C01F 7/22

*Primary Examiner* — Timothy C Vanoy
(74) *Attorney, Agent, or Firm* — John A. Fortkort; Fortkort & Houston PC

(57) ABSTRACT

A method for preparing high purity alumina (HPA) is provided. The method includes subjecting an aluminum feedstock to acid leaching, thereby yielding an aluminum bearing leachate; subjecting the aluminum bearing leachate to solvent extraction, thereby yielding an organic phase which is loaded with aluminum; stripping the aluminum from the loaded organic phase with a stripping solution containing an acid, thereby yielding an aluminum bearing extract; crystallizing an aluminum salt from the aluminum bearing extract; dissolving the aluminum salt in an ammoniacal solution, thereby generating a boehmite precursor compound and an ammonium salt; calcining the boehmite precursor compound to yield HPA; subjecting the ammonium salt to electro-dialysis, thereby yielding ammonia and the acid; and performing at least one step of (a) utilizing the ammonia in preparing the ammoniacal solution used in a subsequent iteration of the method, or (b) utilizing the acid in preparing the stripping solution used in a subsequent iteration of the method.

31 Claims, 5 Drawing Sheets

(56) References Cited

U.S. PATENT DOCUMENTS

| | | |
|---|---|---|
| 9,327,991 B2 | 5/2016 | Hyojo et al. |
| 9,353,425 B2 | 5/2016 | Boudreault et al. |
| 9,982,325 B2 | 5/2018 | Duyvesteyn |
| 9,982,326 B2 | 5/2018 | Duyvesteyn |
| 10,988,828 B2 | 4/2021 | Duyvesteyn |
| 2016/0289795 A1 | 10/2016 | Duyvesteyn |

* cited by examiner

PROCESS FOR THE PREPARATION OF HIGH PURITY ALUMINA

CROSS-REFERENCE TO RELATED APPLICATION

This application claims the benefit of priority from U.S. provisional application No. 63/030,894, filed May 27, 2020, having the same inventor, and the same title, and which is incorporated herein by reference in its entirety.

FIELD OF THE DISCLOSURE

The present disclosure relates generally to the production of alumina, and more particularly, to systems and methodologies for the production of high purity alumina (HPA).

BACKGROUND OF THE DISCLOSURE

High purity alumina (HPA) is a high-value, high margin product which is in significant demand. HPA has many end uses. For example, it is a critical ingredient in the production of synthetic sapphire, which is utilized in the manufacture of substrates for LED lights, semiconductor wafers and scratch-resistant sapphire glass. The latter product is used extensively in wristwatch faces, optical windows and smartphone components. The use of HPA in lithium-ion battery separators has also become increasingly widespread, due to the significant improvements HPA imparts to these devices in terms of performance, longevity, and safety of the battery. HPA is also utilized as the aluminum oxide compound in the electrodes and solid electrolyte components of electric vehicle batteries.

Several methods have been developed in the art for producing HPA. These methods involve the hydrolysis of aluminum alkoxide (see, e.g., U.S. Pat. No. 5,055,019 (Meyer et al.), U.S. Pat. No. 9,327,991 (Hyojo et al.) and U.S. Pat. No. 10,526,211 (Yang et al.); the thermal decomposition of ammonium alum (see, e.g., CN202785697U); and the thermal decomposition of ammonium aluminum carbonate hydroxide (AACH) (see, e.g., U.S. Pat. No. 4,053,579 (Kato et al.)).

The most common process used by major producers is the hydrolysis of aluminum alkoxide. In this process, high purity aluminum alkoxide is synthesized from high purity and refined aluminum metal (an expensive and highly processed feedstock material) and alcohol, and the resulting alkoxide is hydrolyzed to yield hydrated alumina. HPA is then obtained from the hydrated alumina via calcination. This process is described in considerable detail in Yang et al.

One major problem with the process of Yang et al. is the quality of the alumina the process yields. In particular, the process will only yield a high purity product if the aluminum starting material itself is of a highly pure form, since the process lacks processing steps to remove impurities from the system. The recommended starting material in the process of Yang et al. is a very high purity (VHP) aluminum metal having the designation P0404. Unfortunately, P0404 commands a significant premium over regular grade primary aluminum metal and is not readily available.

A further problem with the process of Yang et al. is that even P0404 may be of insufficient purity in this process to consistently yield HPA. Here, it is to be noted that primary aluminum containing more than 99.7% of aluminum and less than 0.1% silicon and 0.2% iron is referred to as high-purity aluminum (or P01020). P0404 has a content of less than 0.04% silicon and 0.04% iron impurities, or a content of pure aluminum of approximately 99.92%. This is only a 3N quality aluminum metal. Such aluminum is used in aerospace (for Li—Al alloys) and defense applications. The HPA applications mentioned above all require 4N (+99.99%) alumina.

Another technology for the production of high purity alumina is based on hydrochloric acid leaching of an aluminum containing feed stock, followed by the salting out of $AlCl_3$ by means of HCl addition and calcining of the resulting $AlCl_3$ crystals. The calcining step yields $Al_2O_3$ and HCl, the latter of which can be recycled. This process, which is described in U.S. Pat. No. 8,337,789 (Boudreault et al.) and U.S. Pat. No. 10,174,402 (Boudreault et al.), appears to be significantly less expensive than aluminum metal-alcohol methodologies of the type disclosed in Yang et al. However, the only possible impurity removal step that is included in this chloride-based process is the crystallization unit operation of $AlCl_3$.

SUMMARY OF THE DISCLOSURE

In one aspect, a method for preparing high purity alumina (HPA) is provided. The method comprises (a) subjecting an aluminum feedstock to acid leaching, thereby yielding an aluminum bearing leachate; (b) selectively recovering an aluminum salt from the leachate, thereby obtaining a purified aluminum salt; (c) reacting the purified aluminum salt with ammonium carbonate, thereby generating a boehmite precursor compound and an ammonium salt; (d) calcining the boehmite precursor compound to yield HPA; (e) subjecting the ammonium salt to electro-dialysis, thereby yielding ammonia and an acid; and (f) performing at least one step of (i) utilizing the ammonia in preparing the ammonium carbonate used in a subsequent iteration of the method, or (ii) utilizing the acid in the step of selectively recovering an aluminum salt from the leachate in a subsequent iteration of the method.

DETAILED DESCRIPTION

Figure 1:
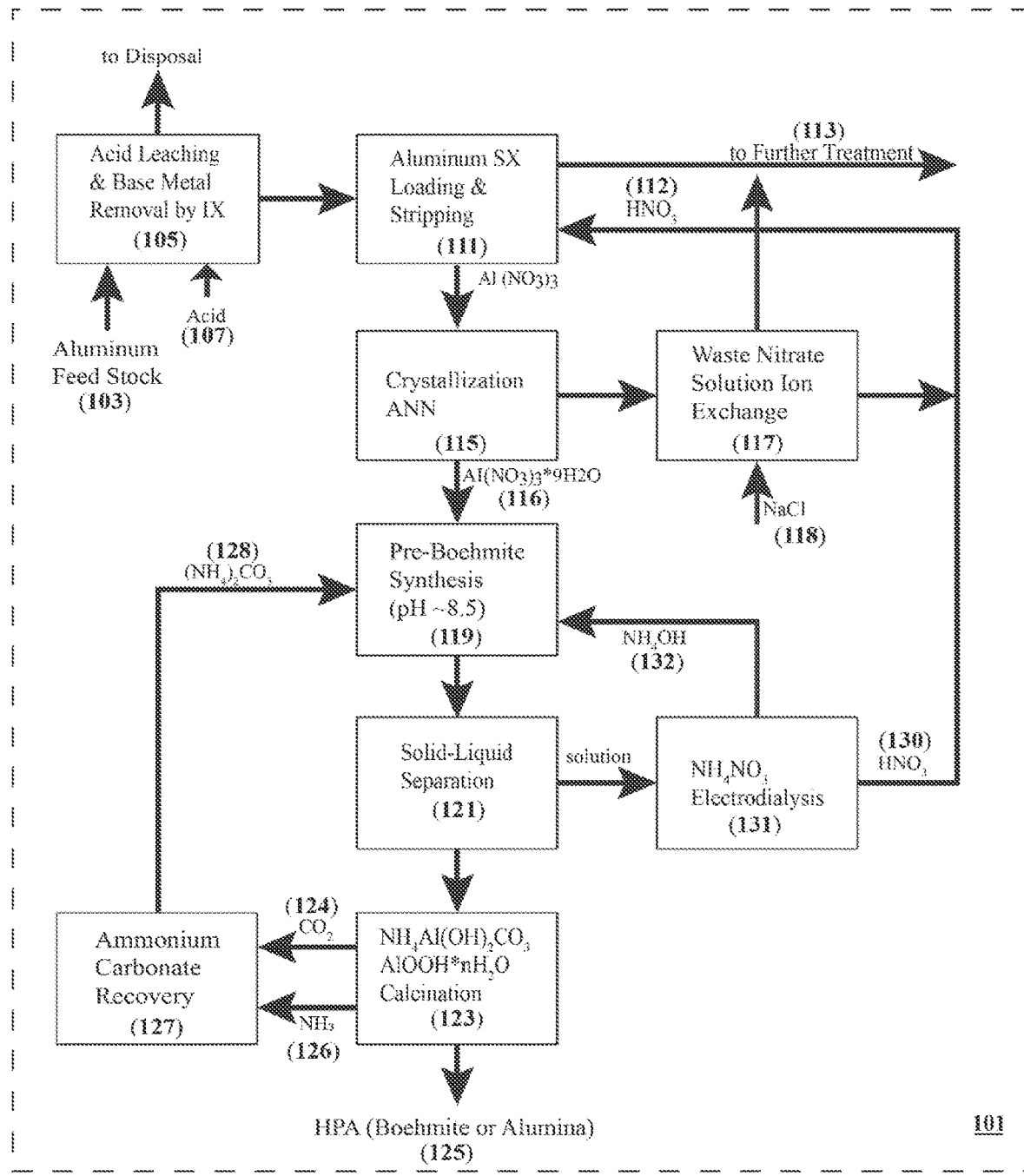
FIG. 1 is flowchart an embodiment of a process for preparing HPA in accordance with the teachings herein.

While the various systems and methodologies developed in the art for the production of HPA may have some desirable attributes, each of these processes also has some infirmities. For example, many of these systems and methodologies are economically inefficient, or require the use of expensive starting materials. Some or all of these infirmities may be addressed with the systems and methodologies disclosed herein.

All of the previously noted methodologies in the prior art have at least one significant shortcoming: they do not include a unit operation that can selectively move aluminum ions from one process step to the next one, thereby leaving most (if not all) critical impurities behind. One of the most important impurities to be exclude from 4N HPA is sodium, as this element can cause electrical shorting in lithium-ion batteries.

Systems and methodologies are disclosed herein for the production of HPA. In a preferred embodiment, aluminum feedstock units are acquired in solid or in liquid form. After production of a liquid stream containing the aluminum units (as, for example, by acid leaching), metals such as sodium may be removed by ion exchange to yield a purified stream. Aluminum values may then be extracted from the purified stream with a suitable, aluminum selective solvent. The subsequently loaded (preferably organic) solvent is then stripped with a suitable acid (preferably nitric acid or hydrochloric acid) to produce a clean solution of the corresponding aluminum salt (e.g., aluminum nitrate or aluminum chloride). The aluminum salt is then crystalized out of the solution as solid crystals (in the case of nitric acid, as $Al(NO_3)_3*9H_2O$ crystals (ANN) or $AlCl_3*6H_2O$ in the case of hydrochloric acid). These crystals are then dissolved in an aqueous solution of ammonium carbonate $(NH_4)_2CO_3$ to precipitate out a hydrated alumina compound. Here it is to be noted that, when mixing aluminum nitrate with ammonium carbonate, it is not desirable to produce simple aluminum carbonate according to REACTION 1:

$$2\ Al(NO_3)_3 + 3\ (NH_4)_2CO_3 \rightarrow 6\ NH_4NO_3 + Al_2(CO_3)_3 \quad \text{(REACTION 1)}$$

Rather, it is preferred to form the ammonium aluminum carbonate hydroxide molecules according to REACTION 2:

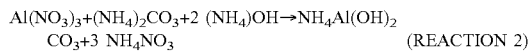

$$Al(NO_3)_3 + (NH_4)_2CO_3 + 2\ (NH_4)OH \rightarrow NH_4Al(OH)_2CO_3 + 3\ NH_4NO_3 \quad \text{(REACTION 2)}$$

This may be achieved, for example, by the addition of ammonium hydroxide to maintain a suitably basic pH.

After solid-liquid separation to isolate the hydrated alumina (with the dissolved ammonia salt (e.g., ammonium nitrate in the case that nitric acid is used as the acid) and water preferably being recycled), the hydrated alumina compound is calcined at either a low temperature (preferably about 600° C.) for a boehmite-type alumina ($\gamma$-AlOOH) or at a higher temperature (preferably greater than about 900° C.) for an alpha-alumina product. Off gases from this process which contain $CO_2$ and $NH_3$ may be recycled as $(NH_4)_2CO_3$ to dissolve more of the aluminum salt (e.g., ANN). The recycling of byproducts at major stages in the process significantly improves the economic efficiency of this approach and allows for on-site treatment and re-use of these byproducts.

FIG. 1 depicts a first particular, non-limiting embodiment of a process 101 in accordance with the teachings herein. With reference thereto, an aluminum feedstock 103 is provided. Various aluminum feedstocks 103 may be utilized in the method. These feedstocks may include, without limitation, solids, liquids or suspensions. Specific examples may include smelter grade alumina (about 99% $Al_2O_3$) or suitable precursors thereof (such as, for example, crystalline $Al(OH)_3$). Smelter grade alumina is readily available and can have a 2N ("two-nine") purity (see TABLE 1 below). HPA should be at a minimum of 4N, and thus, smelter grade alumina or Al(OH)3 is preferably refined if utilized as a feedstock in the processes described herein. In some embodiments, other aluminum containing resources and wastes (including, for example, red mud, or sulfuric acid leach solutions from processing base metal containing ores) may also be employed as a source of aluminum units.

TABLE 1

| Alumina Grades | | |
|---|---|---|
| Purity | $Al_2O_3$ (%) | Impurity (ppm) |
| 2N | 99.0 | 10000 |
| 3N | 99.90 | 1000 |
| 4N | 99.990 | 100 |
| 5N | 99.9990 | 10 |
| 6N | 99.99990 | 1 |

The aluminum feedstock is then subjected to acid leaching and base metal removal 105 via the addition of a suitable acid 107. Sulfuric acid is the preferred lixiviant in this step to solubilize the aluminum, since the sulfate anion can be readily recovered by lime precipitation. Alternatively, nitric acid can also be used as the nitrate ions can be recovered as well by ion exchange. In some embodiments, various other acids may be used, alone or in combination with the foregoing acids. Such other acids may include, for example, hydrochloric acid.

Various waste solutions may be added to the leachate resulting from the foregoing step. Such waste solutions may include, for example, raffinates from copper ore leaching and solvent extraction (5-15 gpl Al in solution), solutions derived from the leaching of lithium ores (1-5 gpl Al in solution), and nickel laterite leach solutions (2-8 gpl Al). In order to ensure the success of aluminum solvent extraction, it is preferred that certain elements that could co-extract with aluminum are removed first or converted into a non-extractable form. For example, ferric salts may co-extract with aluminum, and hence, it is preferred that such salts are removed prior to aluminum solvent exchange (SX) or are converted into ferrous iron salts. Alternatively, ferric iron can be converted by an ionic reduction step into ferrous iron which will not co-extract with aluminum. Other metals, such as copper, nickel and cobalt, may be co-recovered before or after the subsequent aluminum solvent extraction step.

Figure 3:
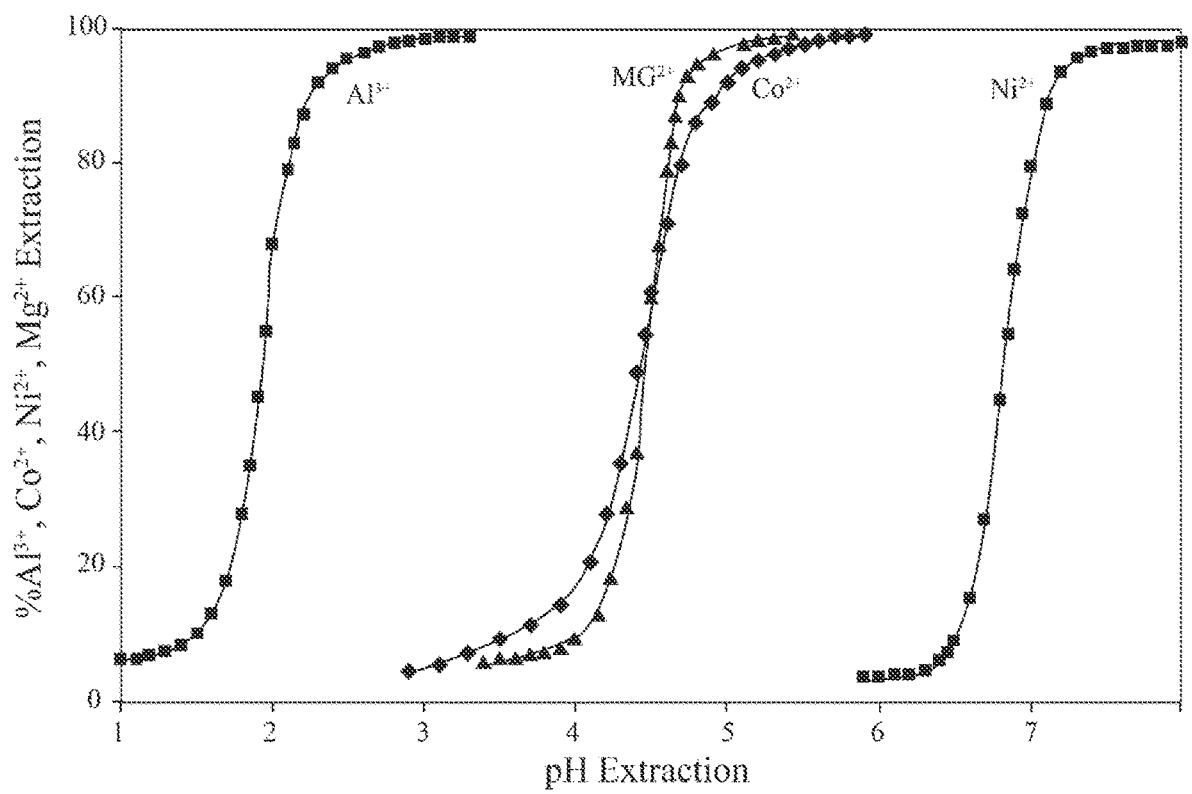
FIG. 3 is a graph of a typical aluminum extraction profile for laterite nickel leach solutions.

The next step involves the solvent extraction of aluminum and the loading and stripping of aluminum ions 111. Various solvents may be utilized in this step to extract aluminum, and these solvents may be combined with various diluents. Preferably, the loaded organic phase is stripped with nitric acid 112, and the raffinate may be sent to further processing 113. By way of reference, a typical aluminum extraction profile (here, for laterite nickel leach solutions) is shown in FIG. 3.

The use of dialkyl phosphinic acids, dialkyldithiophosphinic acids and dialkyl phosphinates (such as, for example, 2-ethylexyl hydrogen 2-ethylhexyl phosphonate, HEH (EHP)) is preferred in this step, and the use of Cyanex 272 (bis(2,4,4-trimethylpentyl)phosphinic acid, or $(C_8H_{17})_2P(O)OH$), Cyanex 301 or PC 88a is especially preferred. A typical metal extraction profile for solvent Cyanex 272 versus pH is shown in FIG. 3.

Figure 2:
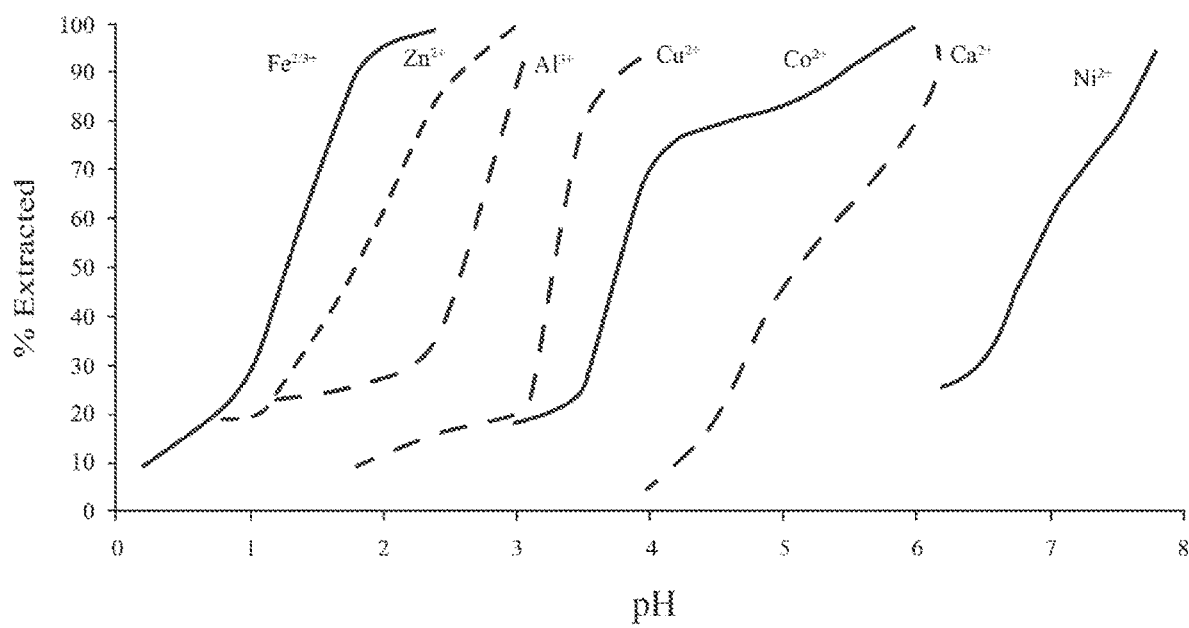
FIG. 2 is a graph of a typical metal extraction profile as a function of pH for Cyanex 272.

The aluminum in solution will load onto Cyanex 272 according to the reaction:

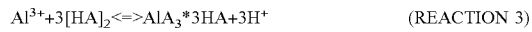

$$Al^{3+} + 3[HA]_2 \Longleftrightarrow AlA_3 * 3HA + 3H^+ \quad \text{(REACTION 3)}$$

where HA represents Cyanex 272 and H and A respectively represent the positive and negative component of the compound. A typical McCabe-Thiele diagram is shown in FIG. 2, with the loading of aluminum onto Cyanex 272 (20 v/v %, Exxsol D80 (80 v/v %, pH=3, Temp 40° C., aqueous/organic ratio=2.5). See Tsakiridis, Hydrometallurgy 80 (2005) 90-97, which is incorporated herein by reference in its entirety.

The graph of FIG. 2 suggests that, for this particular solvent, $Fe^{3+}$ and $Zn^{2+}$ should be removed prior to aluminum extraction. Di2ethylhexyl phosphic acid (D2EHPA) is an organic that will extract both $Fe^{3+}$ as well as $Zn^{2+}$ before it extracts aluminum, and may thus be utilized to remove these metals.

The extract is then subjected to crystallization 115 to produce $Al(NO_3)_3 \cdot 9H_2O$ 116 as described, for example, in U.S. Pat. No. 3,804,598 (Royce et al.). During crystallization 115, other impurities that do not co-crystalize with aluminum may be removed. Nitrates may be removed from the waste-water stream discharged from the crystallization process 115 via an ion exchange process 117. The ion exchange process 117 may utilize sodium chloride 118 as an input. The treated wastewater may then be subjected to further processing 113 and/or recycling or disposal. For example, in some embodiments, the nitrate containing wastewater may be treated and produce nitric acid 120 that will be utilized in a subsequent iteration of the solvent extraction of aluminum and the loading and stripping of aluminum ions 111.

Subsequent to crystallization 115, the $Al(NO_3)_3 \cdot 9H_2O$ 116 is dissolved in an ammoniacal ammonium carbonate solution, which results in the precipitation and formation of a boehmite precursor compound 119. This compound is essentially Ammonium Aluminum Carbonate Hydroxide (AACH), or $NH_4Al(OH)_2CO_3$. This precipitation process step may be facilitated by the presence of an alcohol, although this is not a prerequisite. Without wishing to be bound by theory, it has been postulated that the presence of alcohols (such as, for example, ethanol) will provide a control function for the product particle size. The pH of the solution is preferably maintained at about 8.5.

The boehmite precursor compound AACH 119 is then subjected to solid-liquid separation 121 to isolate the precursor boehmite material as a solid intermediate 120. This preferably involves the use of a plate and frame filter press. The precursor boehmite material AACH 119 is calcined 123 to obtain the product 125, which may be hydrated gamma $Al_2O_3$ or boehmite (AlOOH—with calcining between about 450 and 750° C.) or alpha $Al_2O_3$ (with calcining at greater than about 900° C.). The off gases from the calcination process 123 (primarily $CO_2$ 124 and $NH_3$ 126) are reconstituted 127 to produce an ammonium carbonate solution 128 that may be used to dissolve aluminum nitrate (ANN) in the synthesis of the boehmite precursor compound 119.

The liquid phase from the solid-liquid separation 121 process consists of a mixture of ammonium nitrate (and possibly ethanol). This mixture may be separated 129 into its ethanol (if utilized) and ammonium nitrate components, and the recovered ethanol may be utilized if required in the synthesis of the boehmite precursor compound 119. The recovered ammonium nitrate may be split 131 into nitric acid 130 and ammonia 132, preferably via (bipolar) electrodialysis of $NH_4NO_3$. The recovered ammonia 132 may be utilized in the synthesis of the boehmite precursor compound 119, and the recovered nitric acid 130 may be utilized in the solvent extraction process 111. One typical drawback of electrodialysis is the relatively low concentration of the product streams it yields. In typical embodiments of this methodology, however, the concentrations of these dilute process streams are quite suitable to be used and no further concentrations steps are required.

Figure 4:
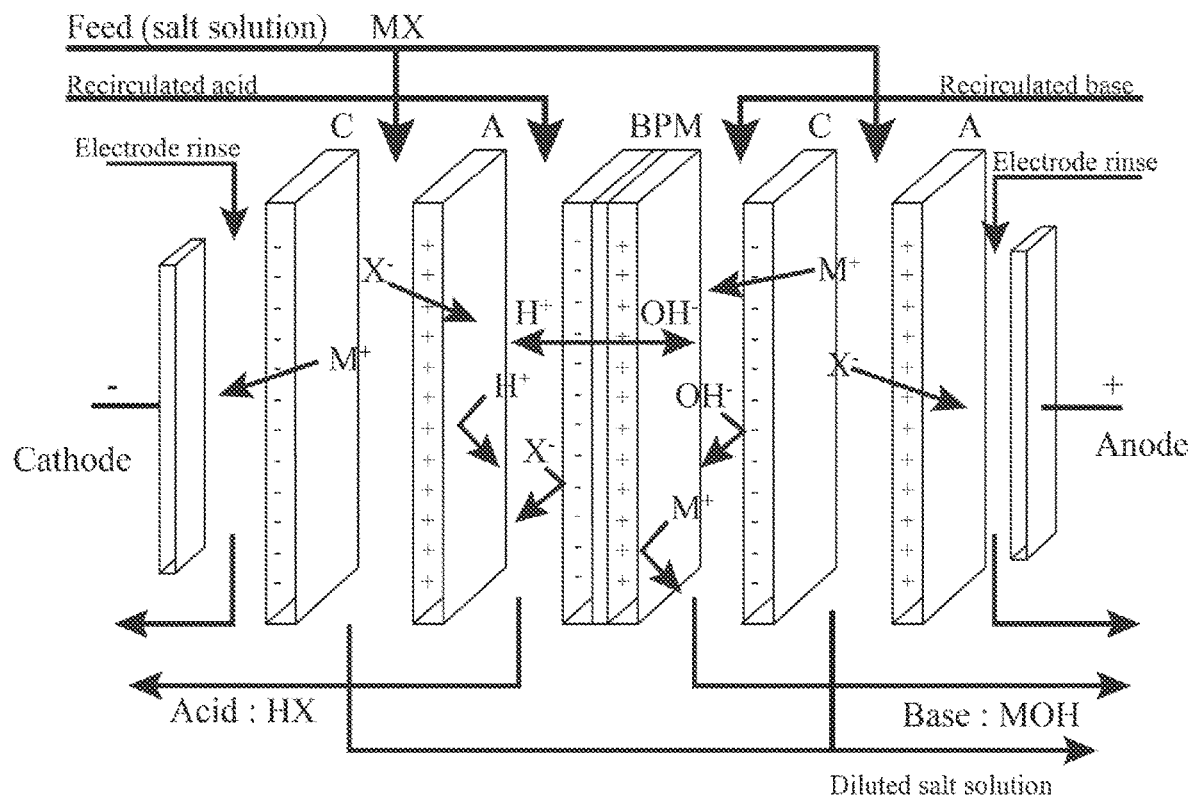
FIG. 4 is an illustration of the use of bipolar electrolysis system to dissociate salts into acidic and basic ions.
Figure 5:
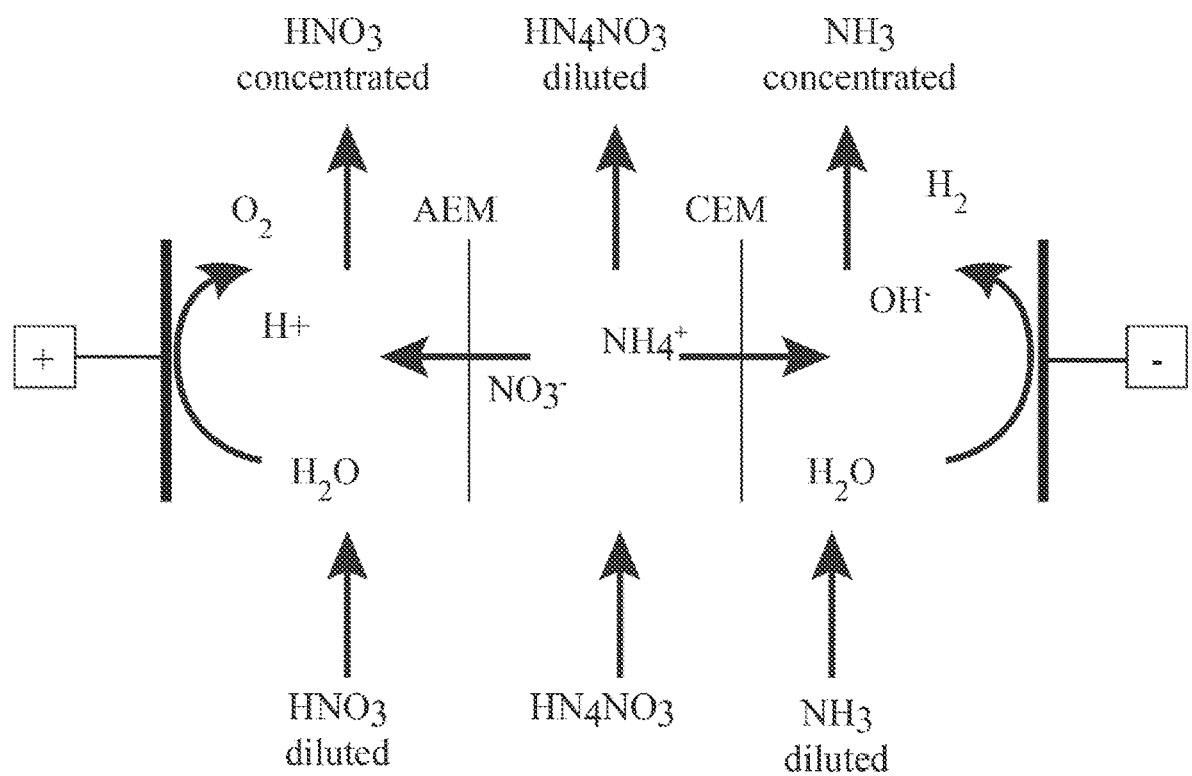
FIG. 5 is an illustration of a cell schema for the production of nitric acid and ammonia from ammonium nitrate.

The electrodialysis of $NH_4NO_3$ is depicted in FIGS. 4-5. This process, which is described in greater detail in [Gain, E. & Laborie, S. & Viers, Ph & Rakib, M. & Durand, G. & Hartmann, Didier. (2002), Ammonium nitrate wastewater treatment by coupled membrane electrolysis and electrodialysis. Journal of Applied Electrochemistry. 32. 969-975. 10.1023/A:1020908702406], and which is incorporated herein by reference in its entirety, involves the coupling of membrane electrolysis and electrodialysis. This process is efficient for regeneration of nitric acid and ammonia and solves issues that might otherwise be posed by salt-laden effluents. The products of this process may be of a relatively high concentration. Nitric acid at a concentration of about 8 mol/L may be obtained with an acceptable current efficiency (this will typically be related to the choice of anion exchange membrane) of about 60%. The gaseous ammonia generated by this process is absorbed into water to yield a pure concentrated ammoniacal solution.

Although the foregoing treatment may appear to be economically inefficient due to the relatively low current efficiency and high cell voltage, the cell voltage will be lower when the process is implemented at industrial scales, because the compartment width in such implementations may be smaller than those of a typical laboratory cell. The electrochemical energy consumption of an industrial implementation of the process would be expected to be approximately 4-5 kWh for the production of 1 kg of nitric acid and the stoichiometric equivalent amount of ammonia (0.27 kg). The quality of the products resulting from this process (nitric acid and absorbed ammonia) is high. The current density may be optimized taking into consideration both fixed and variable costs. Since most if not all impurities have been removed from the process streams by the upfront aluminum solvent extraction unit operation 111, the electro-dialysis unit operation will quite efficient. The economics of the process should also consider the generation of recyclable or saleable products of high purity and appropriate credit for the lack of disposal of salt-laden effluents.

Various grades of alumina may be used in the systems and methodologies disclosed herein. However, the use of smelter grade alumina is preferred, and the uncalcined form of smelter grade alumina is especially preferred. The specifications for this grade are set forth in TABLE 2 below.

TABLE 2

| Smelter Grade Alumina | | |
|---|---|---|
| Chemical Analysis | Typical Value (%) | Limit (%) |
| $Al_2O_3$ | 99.0 | ≥98.0 |
| $SiO_2$ | 0.009 | ≤0.009 |
| $Fe_2O_3$ | 0.012 | ≤0.012 |
| $TiO_2$ | 0.002 | ≤0.002 |
| CaO | 0.002 | ≤0.002 |
| $Na_2O$ | 0.32 | ≤0.32 |

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for preparing high purity alumina (HPA), comprising:
   subjecting an aluminum feedstock to acid leaching, thereby yielding an aluminum bearing leachate;
   selectively recovering an aluminum salt from the leachate, thereby obtaining a purified aluminum salt;
   reacting the purified aluminum salt with ammonium carbonate, thereby generating a boehmite precursor compound and an ammonium salt;
   calcining the boehmite precursor compound to yield HPA;
   subjecting the ammonium salt to electro-dialysis, thereby yielding ammonia and an acid; and
   performing at least one step of
   (a) utilizing the ammonia in preparing the ammonium carbonate used in a subsequent iteration of the method, or
   (b) utilizing the acid in the step of selectively recovering an aluminum salt from the leachate in a subsequent iteration of the method.

2. The method of claim 1, wherein selectively recovering an aluminum salt from the leachate comprises:
   subjecting the aluminum bearing leachate to solvent extraction, thereby yielding an organic phase which is loaded with aluminum; and
   stripping the aluminum from the loaded organic phase with a stripping solution, thereby yielding an aluminum bearing extract.

3. The method of claim 2, further comprising:
   crystallizing an aluminum salt from the aluminum bearing extract.

4. The method of claim 3, further comprising:
   utilizing the ammonium carbonate in preparing an ammoniacal solution used in the step of reacting the purified aluminum salt with ammonium carbonate in a subsequent iteration of the method.

5. The method of claim 1, wherein selectively recovering an aluminum salt from the leachate comprises:
   passing the aluminum bearing leachate through an ion exchange resin, thereby yielding a loaded resin which is loaded with aluminum; and
   stripping the aluminum from the loaded resin with a stripping solution, thereby yielding an aluminum bearing extract.

6. The method of claim 5, further comprising:
   crystallizing an aluminum salt from the aluminum bearing extract.

7. The method of claim 1, wherein reacting the purified aluminum salt with ammonium carbonate includes dissolving the purified aluminum salt in an ammoniacal ammonium carbonate solution.

8. The method of claim 1, further comprising performing, in a subsequent iteration of the method, both of the steps of:
   (a) utilizing the ammonia in preparing the ammoniacal solution used in a subsequent iteration of the method, and
   (b) utilizing the acid in preparing the stripping solution used in a subsequent iteration of the method.

9. The method of claim 1, wherein calcining the boehmite precursor compound to yield HPA generates carbon dioxide and ammonia, and further comprising generating ammonium carbonate from the carbon dioxide and ammonia.

10. The method of claim 1, wherein selectively recovering an aluminum salt from the leachate includes the use of a stripping solution to recover the aluminum salt from a resin or solution, and wherein the stripping solution comprises nitric acid.

11. The method of claim 10, wherein the ammonium salt is ammonium nitrate.

12. The method of claim 1, wherein selectively recovering an aluminum salt from the leachate includes the use of a stripping solution to recover the aluminum salt from a resin or solution, and wherein the stripping solution comprises hydrochloric acid.

13. The method of claim 12, wherein the ammonium salt is ammonium chloride.

14. The method of claim 1, wherein the aluminum feedstock is a solid aluminum feedstock.

15. The method of claim 14, wherein selectively recovering an aluminum salt from the leachate comprises:
   exposing the leachate to an ion exchange resin containing at least one moiety selected from the group consisting of sulfonic, iminodiacetate, aminophosphonic, phosphonic, phosphinic and phosphonate moieties.

16. The method of claim 1, wherein the aluminum feedstock is smelter grade alumina.

17. The method of claim 1, wherein the leachate comprises at least one acid selected from the group consisting of sulfuric acid, nitric acid and hydrochloric acid.

18. The method of claim 1, wherein selectively recovering an aluminum salt from the leachate comprises:
   extracting aluminum values from the leachate using a solvent that is selective to aluminum, thereby obtaining an aluminum loaded solution.

19. The method of claim 18, wherein the solvent contains at least one phosphoryl moiety.

20. The method of claim 1, wherein the aluminum feedstock is uncalcined smelter grade alumina.

21. The method of claim 1, wherein the aluminum feedstock comprises at least one compound selected from the group consisting of aluminum tri-hydrate and aluminum hydroxide.

22. The method of claim 1, wherein the aluminum feedstock is chemical grade alumina.

23. The method of claim 1, wherein the aluminum feedstock is a process waste derived from processing at least one material selected from the group consisting of aluminum, smelter grade alumina, aluminum tri-hydrate and chemical grade alumina.

24. The method of claim 1, wherein the aluminum feedstock is a liquid aluminiferous feedstock.

25. The method of claim 24, wherein the liquid aluminiferous feedstock is an ore leaching solution.

26. The method of claim 24, wherein the liquid aluminiferous feedstock is a processed ore leaching solution derived from extracting from an ore leaching solution at least one metal selected from the group consisting of copper, nickel, titanium, zinc, manganese, lithium and vanadium.

27. The method of claim 1, wherein the electro-dialysis is carried out by a bi-polar system.

28. The method of claim 1, wherein reacting the purified aluminum salt with ammonium carbonate, thereby generating a boehmite precursor compound and an ammonium salt, occurs in a solution, and further comprising:
   maintaining the pH of the solution within the range of about 7.0 to about 9.5.

29. The method of claim 28, wherein maintaining the pH of the solution within the range of about 7.0 to about 9.5 involves the addition of ammonium hydroxide to the solution.

30. The method of claim 29, wherein the aluminum salt is aluminum nitrate, and wherein the molar ratio of ammonium carbonate and aluminum nitrate in maintained at about 3.

31. The method of claim 29, wherein the boehmite precursor compound precipitates from the solution at a temperature within the range of 50° C. to 70° C.

* * * * *